United States Patent
Shamout et al.

(10) Patent No.: US 7,266,992 B2
(45) Date of Patent: Sep. 11, 2007

(54) REMOTE PIPELINE ACOUSTIC INSPECTION

(75) Inventors: Mohammad N Shamout, Damascus (SY); John T Turner, Stockport (GB); Barry Lennox, Warrington (GB); David Smith, Sale (GB)

(73) Assignee: The Victoria University of Manchester, Manchester (GB)

( * ) Notice: Subject to any disclaimer, the term of this patent is extended or adjusted under 35 U.S.C. 154(b) by 14 days.

(21) Appl. No.: 10/497,453

(22) PCT Filed: Nov. 28, 2002

(86) PCT No.: PCT/GB02/05403

§ 371 (c)(1),
(2), (4) Date: Apr. 11, 2005

(87) PCT Pub. No.: WO03/048713

PCT Pub. Date: Jun. 12, 2003

(65) Prior Publication Data

US 2005/0210960 A1   Sep. 29, 2005

(30) Foreign Application Priority Data

Nov. 30, 2001   (GB)   ................... 0128704.4

(51) Int. Cl.
*G01N 29/04* (2006.01)
*G01N 29/14* (2006.01)
(52) U.S. Cl. ................... 73/40.5 A; 73/49.1; 73/592
(58) Field of Classification Search ............ 73/40.5 A, 73/49.5, 49.1, 592
See application file for complete search history.

(56) References Cited

U.S. PATENT DOCUMENTS

| | | | | |
|---|---|---|---|---|
| 3,903,729 | A | * | 9/1975 | Covington ............... 73/40.5 R |
| 4,678,621 | A | * | 7/1987 | Callaghan et al. .......... 376/245 |
| 5,333,501 | A | * | 8/1994 | Okada et al. ................ 73/592 |
| 5,623,421 | A | * | 4/1997 | Savic .......................... 702/51 |
| 6,250,159 | B1 | * | 6/2001 | Kreier et al. ................ 73/602 |
| 6,442,999 | B1 | * | 9/2002 | Baumoel ................ 73/40.5 A |

FOREIGN PATENT DOCUMENTS

| | | |
|---|---|---|
| EP | 0697587 | 2/1996 |
| GB | 1482592 | 8/1977 |
| GB | 2191860 | 12/1987 |
| JP | 8043240 | 2/1996 |

OTHER PUBLICATIONS

E.S. Morgan, "Experience with the Acoustic Ranger—A Sound Method for Tube Inspection", Materials Evaluation/39/ Sep. 1981. pp. 1-5.

(Continued)

*Primary Examiner*—Daniel S. Larkin
(74) *Attorney, Agent, or Firm*—Pillsbury Winthrop Shaw Pittman LLP (57) ABSTRACT

A pipe inspection apparatus comprising an acoustic source (3) for location at a first position in a pipe or pipe network, one or more acoustic or pressure detectors (4) for location at one or more positions in the pipe or pipe network, means for recording and/or displaying a signal detected by the one or more detectors following the generation of an acoustic pulse, and means for allowing the comparison of the detected signal with a predetermined reference signal, differences between the detected and reference signals being indicative of a blockage or leakage in the pipe or pipe network (10).

3 Claims, 7 Drawing Sheets

OTHER PUBLICATIONS

M.N. Shamout et al., Oil Spills in the Mediterranean and Black Sea Regions:, Second International Conference, Oct. 31-Nov. 3, 2000, Istanbul, pp. 173-186.

M.N. Shamout et al., "Leakage Detection in Pipeline Networks", (Abstract offered for consideration by the organisers of OTC 2002, Houston, USA, submitted to conference organisers Sep. 2001), 2 pp.

* cited by examiner

REMOTE PIPELINE ACOUSTIC INSPECTION

BACKGROUND OF THE INVENTION

The present invention relates to the remote inspection of pipeline systems and particularly, though not exclusively, to a method for the remote detection of pipeline blockages and leakage.

Power plants, chemical processing plants and oil processing plants typically include many pipes, often arranged in complex interconnecting networks. In order to maximise operational efficiency, these plants will often be run without interruption twenty-four hours per day and seven days per week. In these circumstances, it will not be possible to access the interior of the pipes during plant operation. This means that visual inspection of the interior of the pipes requires interruption of the plant operation, in most situations leading to a loss of production and cost penalties.

Several methods have been developed for inspecting the interior of pipes without requiring internal access to the point of inspection. One known method is to direct ultrasound through the pipe wall and detect the reflected ultrasound. The presence of an obstruction or leak in a pipe may be indicated by the characteristics of the detected ultrasound. A principal disadvantage of using ultrasound in this way is that only a small section of the pipe can be examined at one time i.e. the inspection is limited to the short length of the pipe at which the ultrasound is directed. Therefore, the inspection of a long pipe, or worse a pipeline network, will occupy a considerable amount of time since the ultrasound generator and detector must be placed adjacent to each section of the pipe which needs to be examined. Moreover, there are many situations in which the outer wall of the pipe will not be easily accessible as may occur, for example, if a pipe passes through a radioactive area in a nuclear power station. Clearly, it would be difficult (or impossible) to use the localised ultrasound method could not be used to inspect these pipes.

E. S. Morgan (Materials Evaluation, pg. 926-930, Vol. 39, September 1981) has described an acoustic detection apparatus used to detect the presence of a blockage in a pipe. The apparatus comprises a loudspeaker and a microphone to be located at one end of an open pipe which, for example, may be a cooling pipe in a power station. An acoustic pulse generated at the loudspeaker propagates along the pipe, is reflected from the open end of the pipe and is detected by the microphone. The signal detected by the microphone is passed to an oscilloscope which displays a trace that is synchronised to the generation of the pulse at the loudspeaker. The trace will show a peak which corresponds to the entrance of the pipe and a further peak which corresponds to the opening at the far end of the pipe. The appearance of any intermediate peak can be interpreted as indicating that a blockage exists in the pipe. The location of the blockage can then be determined from the position of the intermediate peak relative to the entrance peak and the peak which corresponds to the far end of the pipe under investigation.

The method described by Morgan may be used to test a single straight pipe, or a single pipe having several bends. The method suffers from the disadvantage that it is not applicable to pipe networks.

It is a principal objective of the present invention to provide a method of pipeline inspection which may be used to test a pipe network.

According to a first aspect of the invention there is provided a pipe inspection apparatus comprising an acoustic source for location at a first position in a pipe or pipe network, one or more acoustic or pressure detectors for location at one or more positions in the pipe or pipe network, means for recording and/or displaying a signal detected by the one or more detectors following the generation of an acoustic pulse, and means for allowing the comparison of the detected signal with a predetermined reference signal, differences between the detected and reference signals being indicative of a blockage or leakage in the pipe or pipe network.

SUMMARY OF THE INVENTION

The apparatus may be used in pipelines which carry all forms of fluid and is therefore applicable to e.g. steam, oil and water, gas pipelines. The apparatus operates remotely and removes the need for local inspection of individual pipes.

Suitably, the apparatus comprises two acoustic or pressure detectors, the detectors being spaced apart to allow determination of the direction of propagation of a detected acoustic signal.

Suitably, the apparatus includes processing means for processing the detected signal such that only acoustic signals propagating in a particular direction are recorded and/or displayed.

The directional sensitivity enables the amount of digital data which must be recorded and analysed to be reduced by approximately 50%. The direction sensitivity therefore substantially reduces the complexity of the detected signal whilst retaining the majority of the useful signal information.

Suitably, the processing means is arranged to delay by a predetermined time period a signal detected by a first one of the detectors, and subtract the delayed signal from a signal detected by a second one of the detectors, the predetermined time period corresponding to the time taken for an acoustic signal to travel between the first and second detectors, such that the combined signal comprises acoustic signals propagating in a particular direction only.

Suitably, the processing means is arranged to remove artefacts from the combined signal by iteratively taking values from the combined signal, delaying the values by the predetermined time period, and adding the delayed values to the combined signal to generate a revised combined signal, wherein the iteration begins at small time values of the combined signal and moves to progressively larger time values of the combined signal.

Suitably, the apparatus includes means for processing the detected signal such that only acoustic signals propagating in a particular direction are recorded and/or displayed.

Suitably, the apparatus includes means for timing arranged such that only acoustic signals detected during a particular time interval are recorded and/or displayed.

Suitably, the acoustic source comprises a pulse generator arranged to generate pulses which substantially exclude a predetermined range of frequencies.

Suitably, the pulse generator is arranged to generate a square wave.

Suitably, the gradients of the leading and trailing edges of the square wave are selected so as to substantially exclude the predetermined range of frequencies.

Suitably, the substantially excluded predetermined range of frequencies corresponds at least in part to frequencies of noise present in the pipe or pipe network.

Suitably, the apparatus further comprises a signal filter connected between the detectors and the recording and/or displaying means, the filter being arranged to block a predetermined range of frequencies.

Suitably, the predetermined range of frequencies blocked by the filter corresponds at least in part to the range of frequencies present in the background noise observed in the pipe section or the pipeline network.

Suitably, the reference signals comprise signals recorded during previous inspection of the pipe section or pipeline network.

Suitably, the reference signal is based upon knowledge of the acoustic transfer function of the individual components of the pipe section or pipeline network.

According to a second aspect of the invention there is provided a method of pipe inspection comprising locating an acoustic source at a first position in a pipe or pipe network, locating one or more acoustic or pressure detectors at one or more positions in the pipe or pipe network, recording and/or displaying a signal detected by the one or more detectors following the generation of an acoustic pulse, and comparing the detected signal with a predetermined reference signal, differences between the detected and reference signals being indicative of a blockage or leakage in the pipe or pipe network.

Suitably, the method further comprises using two spaced apart acoustic or pressure detectors to determine the direction of propagation of a detected acoustic signal.

Suitably, the method includes processing the detected signal such that only acoustic signals propagating in a particular direction are recorded and/or displayed.

Suitably, the method further comprises delaying by a predetermined time period a signal detected by a first one of the detectors, and subtracting the delayed signal from a signal detected by a second one of the detectors, the predetermined time period corresponding to the time taken. for an acoustic signal to travel between the first and second detectors, such that the combined signal comprises acoustic signals propagating in a particular direction only.

Suitably, the method further comprises removing unwanted spectral components from the combined signal by iteratively taking values from the combined signal, delaying the values by the predetermined time period, and adding the delayed values to the combined signal to generate a revised combined signal, wherein the iteration begins at small time values of the combined signal and moves to progressively larger time values of the combined signal.

Suitably, only signals detected within a predetermined time interval following generation of an acoustic pulse are recorded and/or displayed.

A specific embodiment of the invention will now be described, by way of example only, with reference to the accompanying figures, in which:

DETAILED DESCRIPTION OF THE INVENTION

Figure 1:
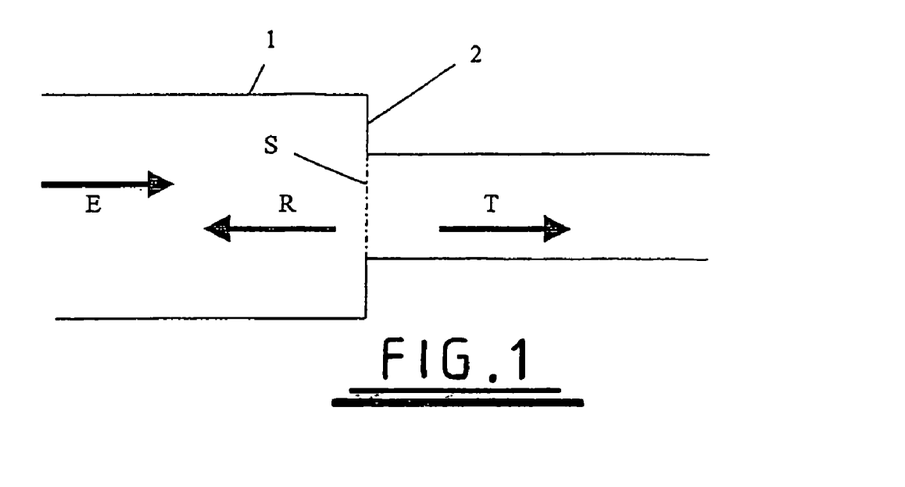
FIG. 1 is a schematic illustration of an acoustic wave propagating though a pipe.

Referring to FIG. 1, an acoustic signal E propagates along a pipe 1. A change of the diameter of the pipe 1 which might, for example, be caused by a partial blockage of the pipe, is shown schematically at 2. The change of pipe diameter causes a change of the impedance experienced by the acoustic signal E as it propagates along the pipe 1. This change of impedance is most easily represented as a step change, as shown schematically as the dotted line S in FIG. 1. A fraction R of the energy of the incident acoustic signal is reflected back by the step change of acoustic impedance, and the remainder T of the acoustic signal continues to propagate in a forwards direction along the pipe.

The impedance experienced by an acoustic signal in a pipe is defined as the ratio of the excess wave pressure to the volumetric flow (in the direction of propagation). The reflected signal R, which is dependent on the step change of impedance in the pipe, is determined using the equation:

$$R = \frac{A_1 - A_2}{A_1 + A_2} E$$

where $A_1$ and $A_2$ are the cross-sectional areas of the first and second sections of the pipe 1.

In addition to the reflection seen when there is a step reduction of the diameter of the pipe, an acoustic reflection will also take place if there is a step increase of the diameter of the pipe. In fact, an acoustic reflection occurs whenever there is a change of impedance, irrespective of whether the impedance increases or decreases in the direction of propagation.

Experimental investigation has shown that leakage from a pipe introduces an impedance change and that this therefore leads to the reflection of an acoustic signal Consequently, it is possible to detect pipeline leakage using acoustic monitoring. Experimental study has shown that the leakage causes a local perturbation in the distribution of the static pressure along the pipe. It is this perturbation of the pressure distribution which causes the reflection of the acoustic signal. It is also found that the change of pressure needed to cause a measurable reflection of the acoustic signal is low. Thus, even a very small leakage from a pipe can be detected by means of the acoustic signal.

Figure 2:
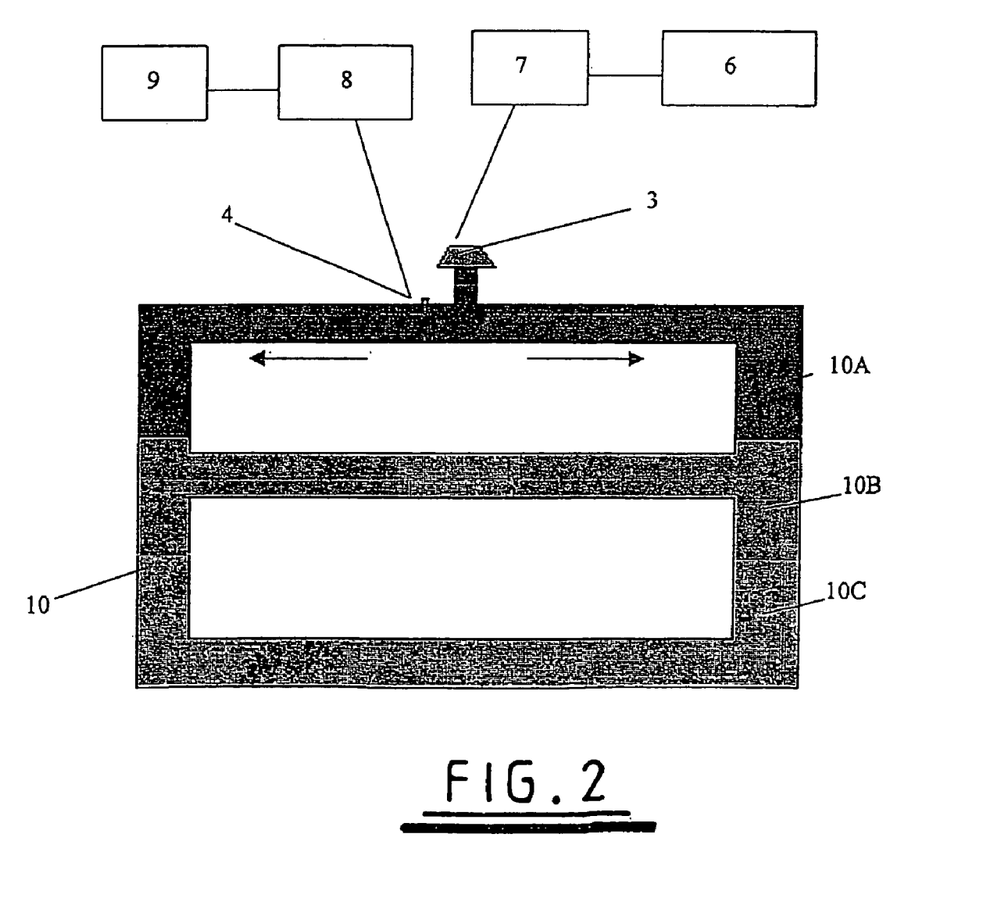
FIG. 2 is a schematic illustration of a pipe inspection apparatus which embodies the invention, and a pipe network.

An inspection apparatus which embodies the invention is shown in FIG. 2. The apparatus comprises a loudspeaker 3 and a detector 4. A pulse generator 6 is connected via an amplifier 7 to the loudspeaker 3. The pulse generator 6 generates square wave pulses, and includes adjustment means to adjust the frequency composition and the pulse repetition rate of the square wave pulses. The detector 4 is connected via a band-pass filter 8 to a personal computer (PC) 9. The PC 9 is provided with a suitable analogue to digital converter so that the filtered detected signal can be recorded in digital form.

The loudspeaker 3 and detector 4 are spaced apart within a pipe network 10. The loudspeaker 3 is located at an entrance to the pipe network 10, and the detector 4 is located close to the entrance to the pipe network and before any corners or pipe connections of the pipe network.

An acoustic signal is generated by the loudspeaker 3. As the acoustic signal propagates along the pipe network 10, increasingly complex reflections of the signal are produced. The reflections will occur as the original signal encounters, for example, a bend, a T-joint, or any component which produces a discontinuity in the impedance of the propagation medium. The reflections are termed first, second or third order reflections, according to the number of the sub-reflections suffered. The method which is described here concentrates on first order reflections: these carry the most useful data about the state of the pipe network 10 and possess the highest energy.

Figure 3:
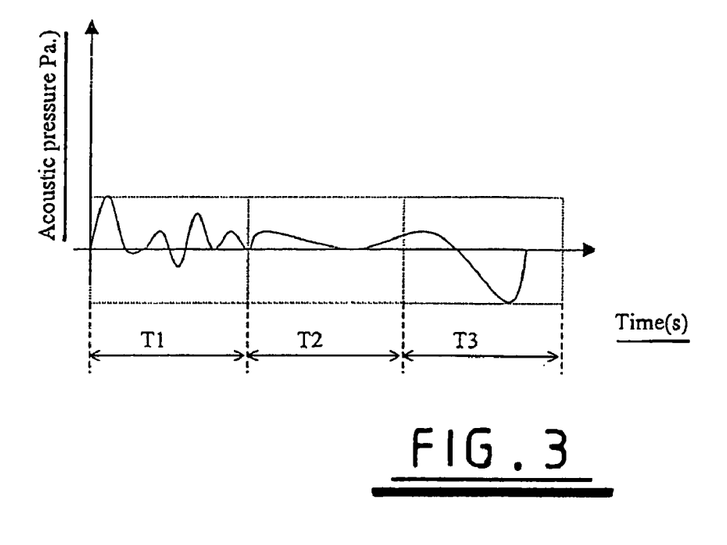
FIG. 3 is a graph showing data recorded for the pipe network.

The pipe network 10 shown in FIG. 2 is marked with three different regions of grey shading 10A, 10B, 10C. FIG. 3 shows a detected acoustic signal which is separated into three regions T1, T2, T3. The regions marked on FIG. 3 correspond to the time periods during which acoustic reflections generated in the three regions of the pipe network will be detected by the detector 4. In other words, the first region 10A contains the parts of the pipe network 10 which are responsible for the first order reflections in time period T1 shown in FIG. 3, the second region 10B contains the parts of the pipe network 10B which are responsible for the first order reflections in time period T2 shown in FIG. 3, etc. This artificial division of the network into different zones enables the initial analysis to be restricted to a consideration of first order reflections only. For the second and third sample periods (T2 and T3, corresponding to test zones 10B and 10C), more complex signals will be observed because second and third order reflections will arrive during these time periods.

Typically, the time series data recorded for the total sample period is stored in digital form. This signal can be considered to be a reference signal against which the performance of the pipe network 10 can subsequently be compared.

Subsequent to recording the reference signal, the pipe network 10 can be tested by repeating the measurement and comparing the resulting signal with the reference signal. An acoustic pulse is injected into the pipe at exactly the same position as that chosen when recording the reference signal. The resulting acoustic signal is then measured using a detector located at exactly the same position as that chosen when recording the reference signal. The detector signal is again recorded in digital form.

The signal is stored, and software is used to identify any differences between the current signal and the reference signal. The difference signal may be considered to be an "error signal". The error signal is analysed and used to determine the location of the leakage or the blockage within the network.

The use of a single detector as described above is most suitable for networks with long pipe lengths where the distances are such that reflections of order higher than the first order do not arrive while first order signals are being collected. Alternatively, a single detector may be used when the amplitude of the higher order reflections is so small as to be negligible. There are instances however, particularly for a medium to small pipeline network, where second and third order reflections may corrupt the signal, making it difficult to interpret a signal generated using a single detector. Where this is the case, the invention may use more than one detector to discriminate the direction of propagation of the acoustic signals.

A pair of detectors spaced apart along the pipe length provide discrimination of the direction of propagation of the acoustic signals, since a propagating acoustic signal will pass the detectors at different times. The manner in which this discrimination of the wave direction is achieved is described in relation to a straight section of pipe, as shown in FIG. 4, rather than a pipe network in order to simplify the description.

Figure 4:
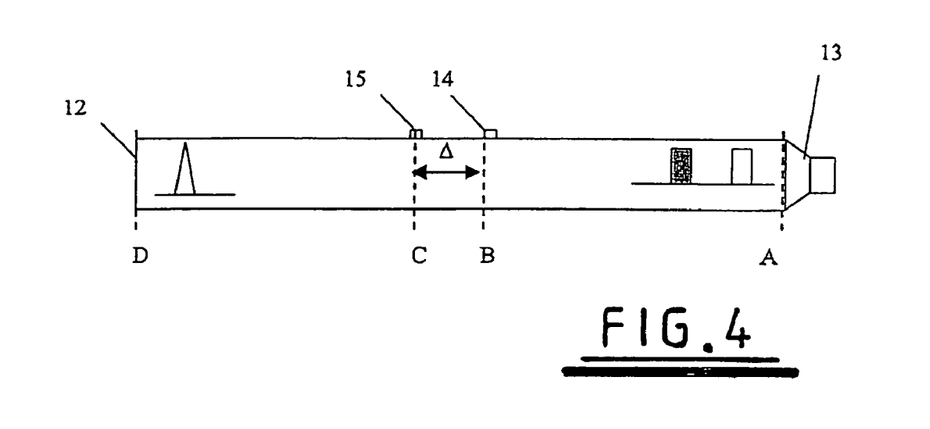
FIG. 4 is a schematic illustration of a pipe inspection apparatus which embodies the invention, and an open ended pipe.

Referring to FIG. 4, a pipe 11 has an open left hand end 12 and is provided with a speaker 13 at a right hand end. A first detector 14 and a second detector 15 are installed flush with the inner surface of the wall of the pipe 11. The detectors are separated by a known distance $\Delta$.

An acoustic pulse is generated by the speaker 13, and propagates from right to left along the pipe 11. The signal is reflected by the open end 12 of the pipe, and is subsequently reflected by the speaker 13 at the right hand end of the pipe. It is desired to process the signals detected by the detectors 14, 15 in such a way that a measure of directional sensitivity is imparted to the detected signals. Unfortunately, this process also introduces additional signal components which complicate the resulting signal. Further processing is used to remove these unwanted components. The signal processing is described below.

Figure 5:
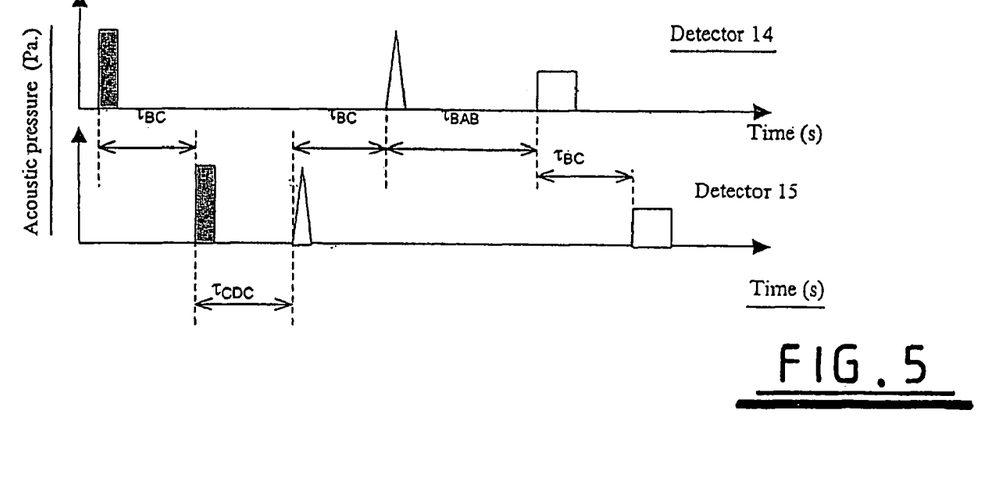
FIG. 5 is a schematic illustration of data generated by the apparatus and the open ended pipe shown in FIG. 4.

The aim of the signal processing, in this instance, is to accept only those signals traveling across the detectors 14, 15 from left to right and to reject those traveling from right to left. FIG. 5 shows the signals detected by the first and second detectors 14, 15 (these recorded in a digital form by a PC (not shown)). The signal detected by the detectors 14, 15 has three components. These are:
(i) the original input (or source) signal—shown as a grey rectangle
(ii) the signal coming to the detector unit from the left (having been reflected from the open end 12 of the pipe)—shown as an open triangle
(iii) the signal coming to the detector unit from the right (having been reflected from the open end 12 of the pipe and then reflected from the speaker 13 at the opposite end of the pipe)—shown as an open rectangle In any practical implementations of the invention more complicated signals will be detected. Although the simple signals shown in FIG. 5 are used here for ease of illustration, it will be appreciated that the different wave shapes used to represent the signal are for ease of illustration and that, in practice, the detected signal will comprise pulse shapes which correspond to the pulse generated by the loudspeaker 13.

The locations of the loudspeaker 13, detectors 14, 15 and open pipe end 12 are indicated in FIG. 4 by broken lines which are designated as A, B, C and D, respectively. The signals detected by detector 14, as shown in FIG. 5, are separated by time periods which are indicated in terms of the propagation time $\tau$ taken to travel between A, B, C and D. $\tau_{AB}$ is the time needed for the acoustic wave to propagate from section A to section B, $\tau_{BAB}$ is the time needed for the acoustic wave to propagate from section B to section A and back, and $\tau_{CDC}$ is the time needed for the acoustic to propagate from section C to section D and back, etc.

It can be seen that signals propagating from left to right are detected first by detector 14, whereas signals propagating from right to left are detected first by detector 15.

Figure 6:
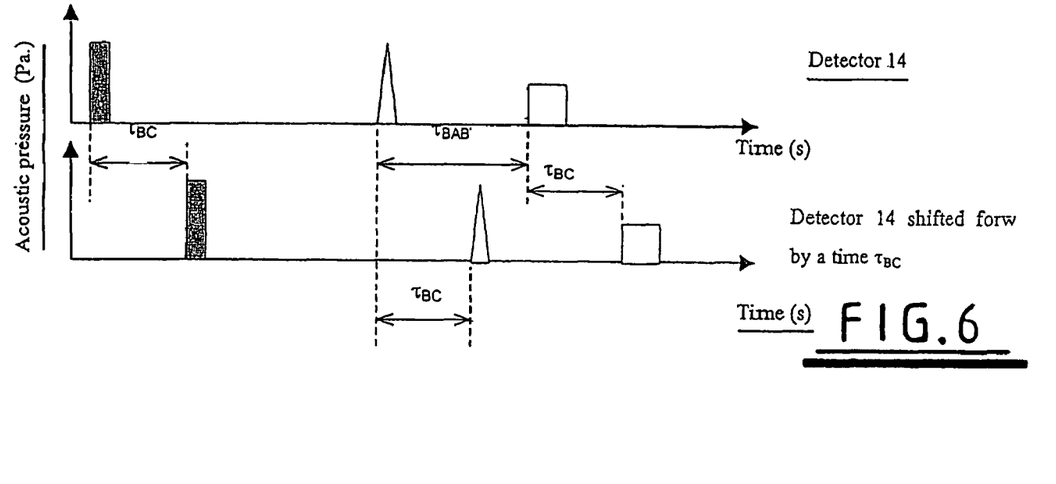
FIGS. 6 to 8 are schematic illustrations of processing performed on the data generated by the apparatus.

The first step of the signal processing is shown in FIG. 6. The signal detected by detector 14 is time-shifted (forward along the time axis) by the time period $\tau_{BC}$. This is the time required for an acoustic signal to travel between detectors 14 and 15 and corresponds to the separation distance $\Delta$ divided by the speed of sound c in the fluid i.e. $\tau_{BC} = \Delta/c$.

Figure 7:
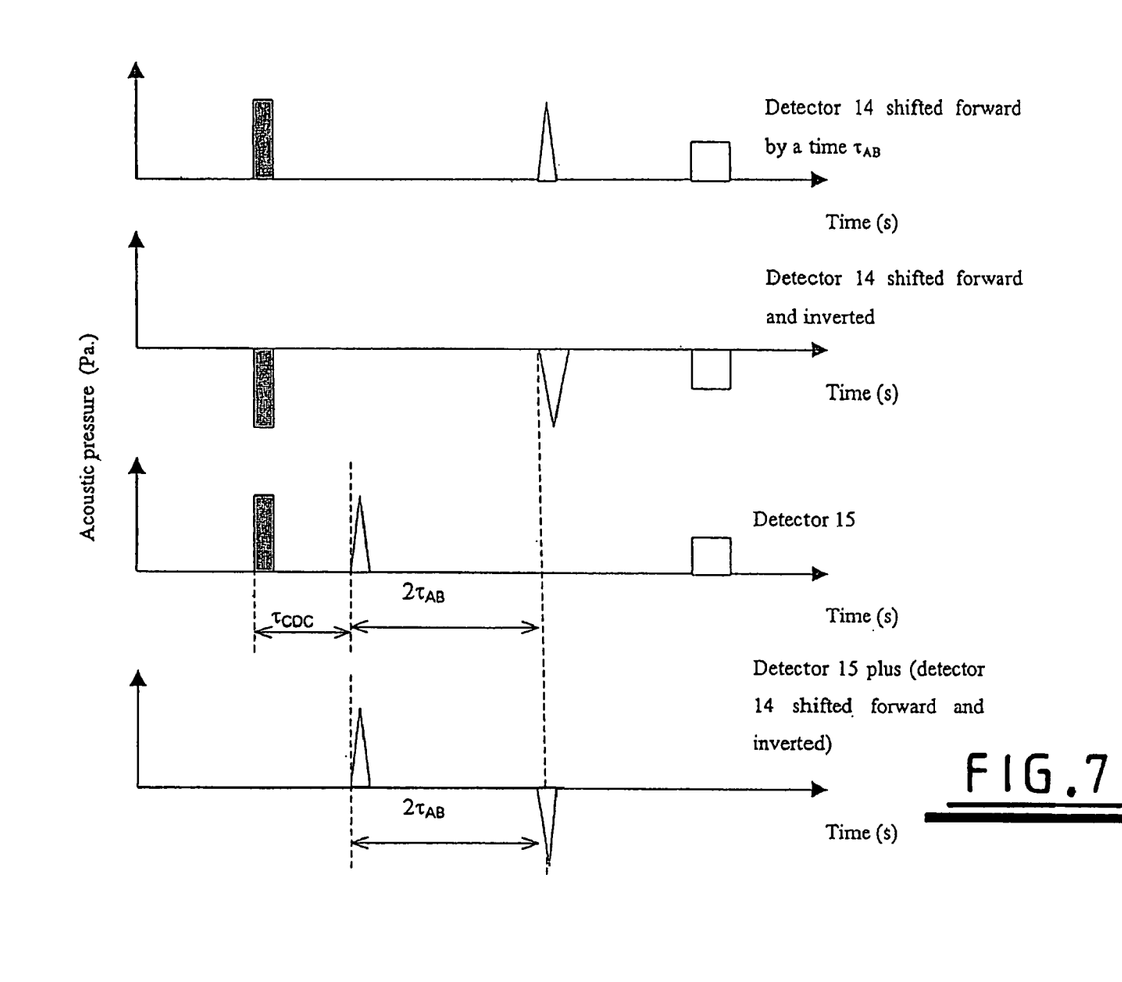

The signal detected by detector 14, having been time-shifted, is inverted and added to the signal detected by detector 15. This is shown in FIG. 7. The addition removes the source signal and every other signal component propagating along the pipe from right to left. This leaves only the components of the signal propagating along the pipe from left to right.

In the graphical form used here, the resulting signal, as shown at the bottom of FIG. 7, consists of the one component from the right (the triangular wave) and another wave with the same shape but inverted and displaced by a time period $2\tau_{AB}$. Time is measured from an arbitrary zero which is related to the passage of the waves over detector 15.

Figure 8:
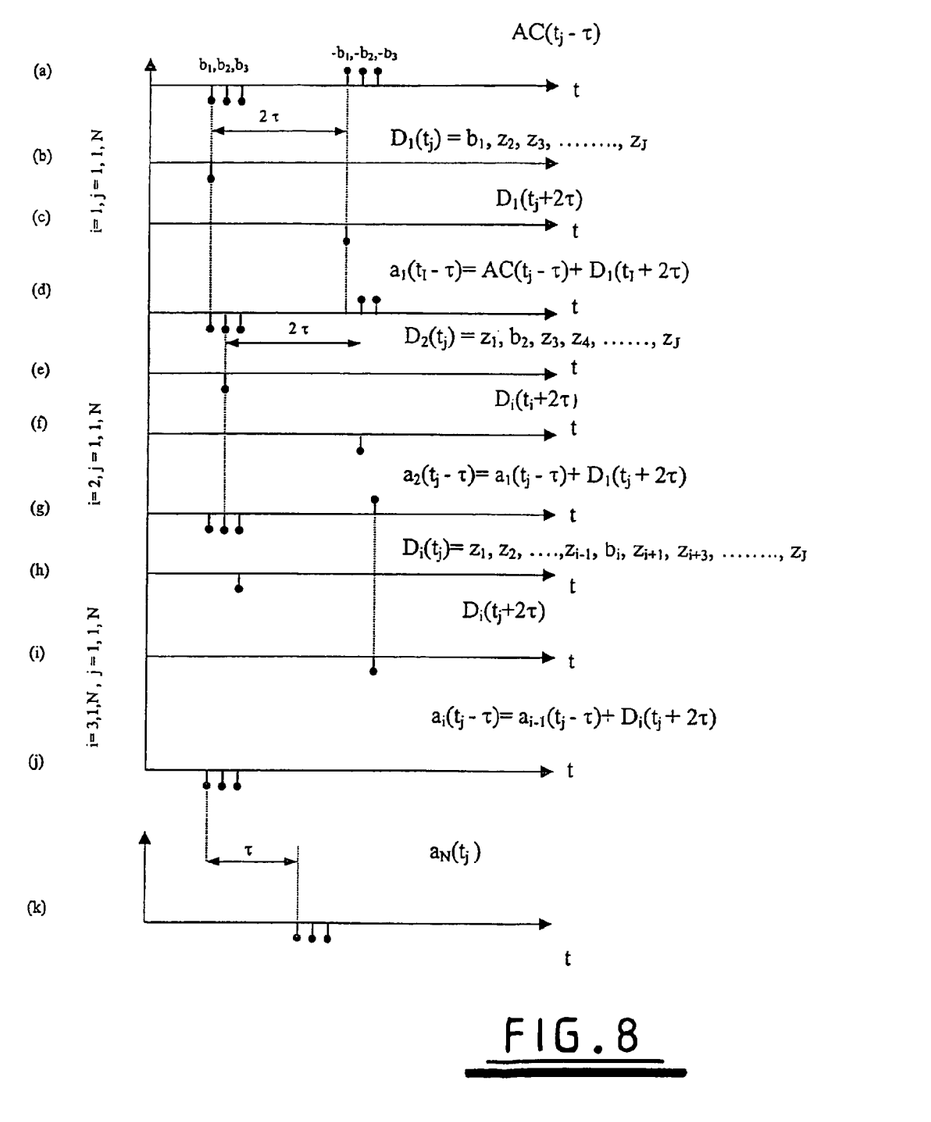
Figure 9A:
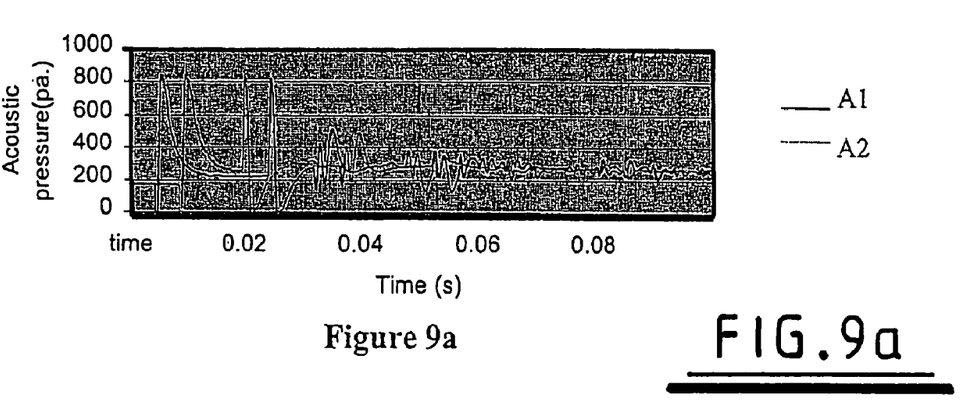
FIG. 9 is a series of graphs showing data recorded by the apparatus, and processing of the data.
Figure 9B:
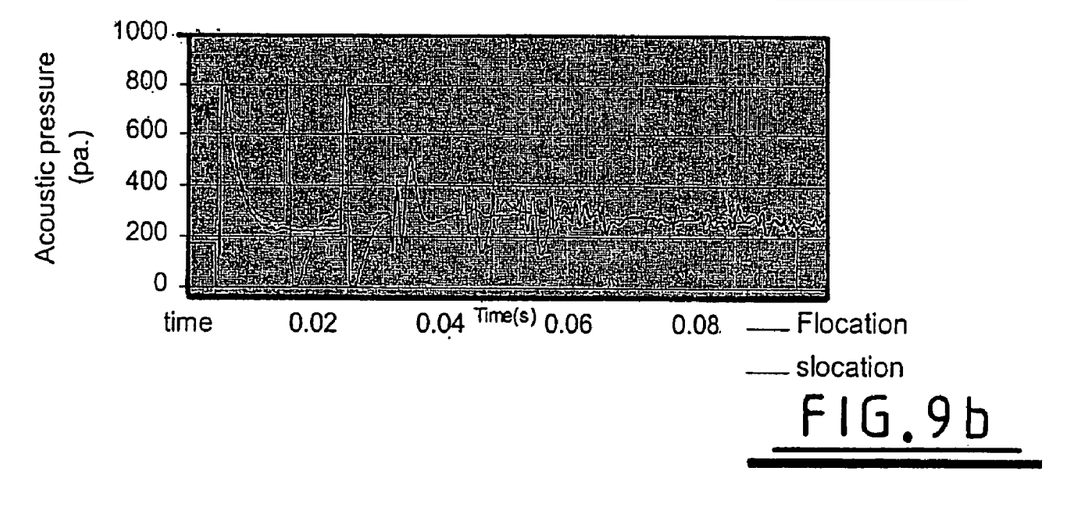
Figure 9C:
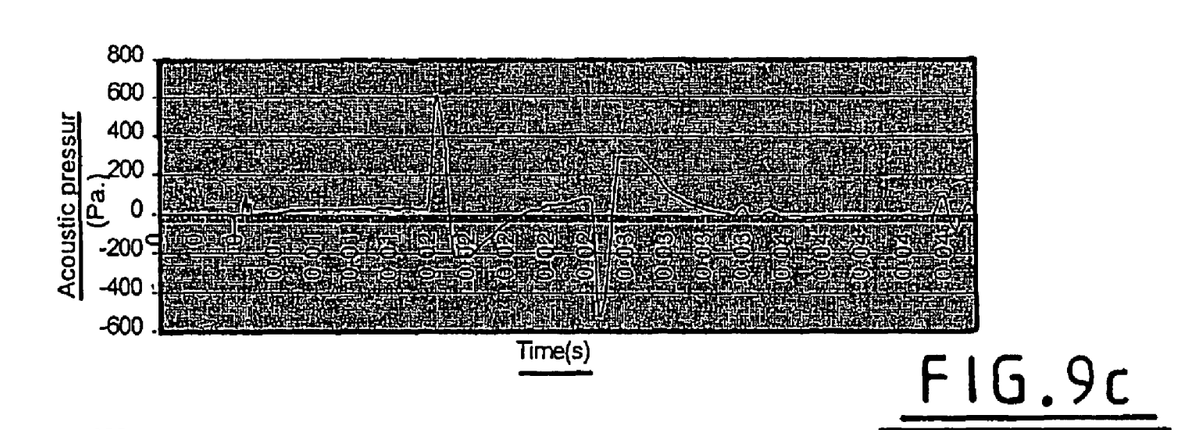
Figure 9D:
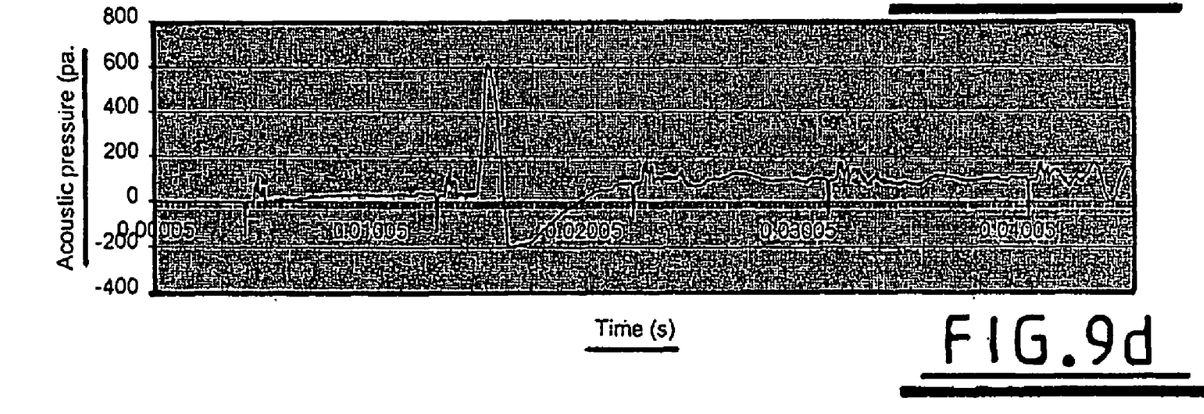

It is possible to retain the signal shown in FIG. 7, and use it as a reference signal for subsequent inspection of the pipe. Comparison of an inspection signal, processed in the same way, with the reference signal should then allow the location of a leakage (or obstruction) to be determined. It will be appreciated that the inverted triangular wave shown in FIG. 7 is an artefact which does not add any useful information to the reference signal. Where the reference signal is complicated, as is often the case in practical implementations of the invention, artefacts such as these will add considerable complexity to the reference signal. Although the artefacts would be reproduced in a subsequent inspection signal, the signal will be more easily interpreted if the artefacts are removed. FIG. 8 illustrates the process by which the artefacts are removed.

Referring to FIG. 8, a signal has been detected by two detectors and has been processed as described above. The resulting signal is shown schematically in FIG. 8(*a*). The signal is recorded as a series of digital values, and these digital values are individually represented by lines topped with discs. The signal comprises three values which have been replicated as an artefact of the processing described above as three corresponding (inverted) values at a later time. The entire signal is designated as $AC(t_j - \tau)$.

The processing starts by creating two numerical counters $$i=1:1:I, j=1:1:J$$

where $I=J=N$ is the total number of digital values in each detected signal. In a first series of calculations, the counter i is set to 1, while the counter j is set as a sequence of values $j=1, 1, J$.

A new variable $b_1$ is created, where $$b_1 = AC(t_1 - \tau)$$

is the value of the very first sample of the time series $AC(t_j - \tau)$—see FIG. 8(*a*). Note that in successive calculations, this element $b_i$ can be treated as a disposable value. It can then be overwritten as the calculations proceed to produce $b_1, b_2, b_3, \ldots, b_N$.

A new time series $D_1(t_j)$ is created—see FIG. 8(*b*)—where the digitally sampled series takes discrete values as j takes successive values up to J.

$$D_1(t_j) = b_1, z_2, z_3, \ldots, z_J.$$

In this sequence, the elements $z_2, z_3, \ldots, z_J$ all have zero value.

The new time series $D_1(t_j)$ is shifted forward in time by $2\tau$ and is written as $D_1(t_j + 2\tau)$ where $i=1$ and j takes successive values between 1 and J. This is shown in FIG. 8(*c*).

The time series $D_1(t_j + 2\tau)$ is added to the time series $AC(t_j - \tau)$, operating sequentially on the discrete values of the new series, as shown in FIG. 8(*d*). This leads to the time series $$a_1(t_j - \tau) = AC(t_j - \tau) + D_1(t_j + 2\tau).$$

It can be seen from FIG. 8(*d*) that the artefact $-b_1$ has been removed from the signal by the addition of the time series $D_1(t_j + 2\tau)$.

The step counters are set to $i=2, j=1, 1, J$, and the new variable $b_2$ is calculated, where $$b_2 = a_1(t_2 - \tau).$$

This variable $b_2$ is the second discrete value of the time series shown in FIG. 8(*d*), i.e. $a_1(t_i - \tau)$. As before, a new time series is created where the discrete values of the series are represented by $$D_2(t_j) = z_1, b_2, z_3, z_4, \ldots, z_J.$$

Again, the elements $z_1, z_3, \ldots, z_J$ all have zero value. The time series $D_2(t_j)$ is shown in FIG. 8(*e*).

The time series $D_2(t_j)$ is shifted forward in time by $2\tau$ leading to the new series $D_2(t_j + 2\tau)$ as shown in FIG. 8(*f*). The time series $D_2(t_j + 2\tau)$ is added to the time series $a_1(t_j - \tau)$ to produce $$a_2(t_j - \tau) = a_1(t_j - \tau) + D_1(t_j + 2\tau).$$

The time series $a_2(t_j - \tau)$ is shown in FIG. 8(*g*). It can be seen in FIG. 8(*g*) that the artefact $-b_2$ has been removed from the signal.

The process is repeated for the entire signal, thereby removing the remaining artefacts. In mathematical terms, the processing may be generalised as follows:

The counter i is set to the values $$i=3,1,I.$$

For each increment in the value of i, the counter j takes all the values $$j=1,1,J.$$

Running through the values of the counter i creates the new variable $$b_i = a_i - 1(t_j - \tau)$$

and a new time series $D_i(t_j)$ which has discrete values $z_1, z_2, \ldots, z_{i-1}, b_i, z_{i+1}, z_{i+3}, \ldots, z_j$ at the sampling points. This time series is then shifted in time by $2\tau$ and is written as $$D_i(t_j + 2\tau)$$

Finally, the time series $D_i(t_j + 2\tau)$ is added to the time series $a_{i-1}(t_j - \tau)$ to produce the series $$a_i(t_j - \tau) = a_i - 1(t_j - \tau) + D_i(t_j + 2\tau).$$

These processes are shown schematically in FIGS. 8(*h*), (*i*), (*j*).

The result of the iterative processing is a time series $a_N(t_j)$ which is free from artefacts caused by detection of a single event by two detectors; i.e. the series represents all signals propagating in one direction as seen by one detector. The series is forwarded by a time period $\tau$ producing the time series $a_N(t_j)$ which can be related solely to signals propagating from the right with a time base measured from one detector (in this example detector 15). This is shown in FIG. 8(*k*).

The advantage of the processing algorithm is seen more clearly when applied to real signals which will generally have more complicated waveforms. Some examples of typical signals derived from experimental work are shown in FIG. 9.

Analysis of signals as described, first accepting signals propagating in one direction then signals propagating in the other direction, enables leakages or blockages in complex pipeline networks to be detected and located. It is often the case that a leakage or blockage will result in the detectors 14, 15 detecting acoustic signals propagating in both directions. Where this is the case, the relative times at which the signals are detected may be used to determine the exact location in the pipe network of the leakage or blockage. If only one signal is detected, this may be used to determine the distance of the leakage or blockage from the detector.

It is important to emphasise that detectors 14 and 15 must be mounted at exactly the same positions as used to obtain the reference signal whenever an inspection is performed. The location of the speaker is not critical.

It will be appreciated that the use of direction discrimination may be used in combination with the selection of time periods (as described in relation to FIG. 1). This is particularly advantageous when inspecting a network of pipes since it reduces substantially the complexity of the data to be analysed.

Each bend, component or connection between sections in a pipe network, will produce an acoustic reflection. Therefore, by reference to FIG. 2, it will be clear that many reflections will be generated within a typical pipeline network. Without directional sensitivity, the number of detected acoustic pulses could be so many as to make analysis extremely difficult and computationally intensive. The directional sensitivity provides a substantial reduction in the number of acoustic pulses which are detected, and allows those signals which contain no useful information to be rejected.

Where the network of pipes to be tested is especially complicated, the network may be effectively divided into sections, each of which can be tested separately This is achieved by selecting an appropriate location for the detectors and analysing only those signals detected within a predetermined time interval, not by the physical closure of sections of the pipeline. Direction discrimination may also be used to facilitate the effective division of the pipe network into sections.

The method described may be used irrespective of whether the pipe network 10 is empty, or is filled with a process fluid (noting that, even when empty the pipe network 10 will still contain air). The fluid may be static or may be moving around the pipe network 10 (i.e. the pipeline network may be in use). It will of course be appreciated that the speed of acoustic signals transmitted through the network will be a function of the fluid filling the network and therefore it may be appropriate to calibrate the system at the time data is collected so that changes in both the composition and conditions, such as pressure, temperature and composition of the fluid are compensated for. The band-pass filter 8 and the pulse generator 6 are used to minimise the impact of noise generated by pumps and the flowing fluid within the pipeline network on the detected signals. To achieve this, the detectors are first used to observe the background noise in the absence of generated acoustic pulses. The noise so detected is passed to the PC 9 which analyses the signal characteristics. Typically, this background noise characteristic will show an energy distribution which covers a range of high frequency components. The pulse generator, which is configured to generate a square wave, is adjusted by the PC so that it generates a square wave whose frequency components lie below the band of high frequency noise (i.e. a square wave having appropriately sloped leading and trailing edges). The band-pass filter 8 can then be adjusted to reject the band of high frequency background noise components.

In one mode of operation, the pipeline network is tested following installation and a set of detected signals is recorded to act as a reference. In this situation, the time varying signals yielded by each detector will comprise a series of energy or amplitude peaks spread out over time (with a typical time period of the order of several milliseconds). Clearly, each detector will provide its own individual signal and the location of each amplitude peak on a given detector signal will be determined by the time taken for the acoustic pulse to travel to a point of reflection and return back to the detector. Following a period of operation of the pipeline network, the pipe network can be inspected by placing the loudspeaker and the detectors in exactly the same positions that were used to generate the reference signals. When the signals yielded by the detectors are compared to the reference signals, any new peak on the signals will indicate the presence of a blockage or leakage in the network. Additionally, since the temporal position of the new signal peak will be indicative of the distance of the blockage or leakage from the detector, two such signals derived from two suitably located detectors may be used to determine the precise position of the blockage or leakage.

In a second mode of operation, the pipeline network does not need to be calibrated following installation in order to obtain a set of reference (characteristic) signals. Instead, knowledge of the construction and layout of the network can be used as the basis for a mathematical prediction of the expected acoustic behaviour so that the reference acoustic characteristic signal can be obtained. This is done using MATLAB software, with each component of the network being represented by its individual response function. These separate response functions can be combined into a representation of the acoustic characteristics of the network. This enables the acoustic transfer function of the network to be obtained indirectly in situations where any other procedure might not be possible.

More than one loudspeaker may be located in a pipe network, together with several detectors or several pairs of detectors. One loudspeaker may be used to generate an acoustic pulse, resulting signals being detected at each of the detectors, then a different loudspeaker may be used to generate an acoustic pulse, with resulting signals again being detected at each of the detectors, and so on to provide complementary data which may subsequently be combined together.

The loudspeaker(s) and detector(s) may be held permanently within a pipe or pipe network to allow periodic pipe inspection.

The detectors may be mounted on a rig which maintains the detectors at a fixed separation, the rig being lowered into a pipe network to be inspected. The rig may be mounted on a 'pig' arranged to travel through all or part of the pipe network.

It will be appreciated that any suitable loudspeaker or other acoustic pulse generation means may be used to generate the acoustic pulses. Although the use of square wave acoustic pulses has been described, any other suitable pulse waveform may be used. Typically, the detectors could be microphones, hydrophones or sensitive pressure detectors. One specific type of detector which has provided good results is XTM or XTML microphone manufactured by Kulite Inc. Any other suitable detectors may be employed.

The invention claimed is:

1. A method of pipe inspection comprising locating an acoustic source at a first position in a pipe or pipe network, locating two or more acoustic or pressure detectors at two or more positions in the pipe or pipe network, recording and/or displaying a signal detected by each of the two or more detectors following the generation of an acoustic pulse, and comparing each detected signal with a predetermined reference signal, differences between the detected and reference signals being indicative of a blockage or leakage in the pipe or pipe network, using two spaced apart acoustic or pressure detectors to determine the direction of propagation of a detected acoustic signal; and the method includes processing the detected signal such that only acoustic signals propagating in a particular direction are recorded and/or displayed; and the method further comprises delaying by a predetermined time period a signal detected by a first one of the detectors, and subtracting the delayed signal from a signal detected by a second one of the detectors, the predetermined time period corresponding to the time taken for an acoustic signal to travel between the first and second detectors, such that the combined signal comprises acoustic signals propagating in a particular direction only, and removing artefacts from the combined signal by iteratively taking values from the combined signal, delaying the values by the predetermined time period, and adding the delayed values to the combined signal to generate a revised combined signal, wherein the iteration begins at small time values of the combined signal and moves to progressively larger time values of the combined signal.

2. A method according to claim 1, wherein only signals detected within a predetermined time interval following generation of an acoustic pulse are recorded and/or displayed.

3. A pipe inspection method according to claim 1, wherein the said detected signal is a reflection of the acoustic pulse.

\* \* \* \* \*

UNITED STATES PATENT AND TRADEMARK OFFICE
CERTIFICATE OF CORRECTION

PATENT NO.        : 7,266,992 B2
APPLICATION NO.   : 10/497453
DATED             : September 11, 2007
INVENTOR(S)       : Mohammad N. Shamout et al.

It is certified that error appears in the above-identified patent and that said Letters Patent is hereby corrected as shown below:

On title page, item 73 Assignee
      replace "The Victoria University of Manchester, Manchester (GB)"
      with --The University of Manchester, Manchester (GB)--.

Signed and Sealed this

First Day of April, 2008

JON W. DUDAS
*Director of the United States Patent and Trademark Office*